3,246,972
METHOD OF MAKING CERAMIC ARTICLE
Gail P. Smith, Corning, N.Y., assignor to Corning Glass Works, Corning, N.Y., a corporation of New York
No Drawing. Filed Aug. 18, 1961, Ser. No. 132,284
9 Claims. (Cl. 65—18)

This invention broadly relates to articles composed of mixtures of crystalline materials and thermally devitrifiable glasses having the same or similar constituents as the crystalline materials and which will convert at least in part to the same crystalline phase as that of the crystalline materials and more particularly to refractory ceramic particles having low thermal expansion coefficients, high thermal and chemical durability and high thermal shock resistance, composed primarily of a sintered mixture of low expansion crystalline lithia-aluminosilicates and a compound which will convert to the same crystalline phase as that to which it is bonded, and a method for making such articles.

Refractory compositions having high thermal shock resistance, high temperature and chemical durability and low thermal expansion coefficients are used in making heat exchangers, burner plates, mist eliminators, furnace furniture, heater elements, honeycomb structures, and items where relative independence of dimensions on temperature is important. One of the more important properties, which is essential for compositions to be used for such purposes, is a low linear coefficient of thermal expansion (hereinafter referred to as "expansion coefficient"). This expansion coefficient may preferably be zero. As another important property, the refractory compositions should have a relatively long sintering range or interval between the sintering temperature and the sagging temperature, in order that green bodies made therefrom may be fired in a conventional manner. Another requirement is high thermal durability so that articles made therefrom may be used for prolonged periods of time at elevated temperatures without loss of useful properties. In addition high chemical durability is required so that the materials used in contact with the finished article do not react, combine or otherwise chemically deteriorate the article during prolonged periods of exposure thereto. Furthermore, the compositions must have a high modulus of rupture, to provide adequate mechanical strength for articles made therefrom.

The use of cordierite is commonly resorted to for such applications since it is inexpensive and has a lower expansion coefficient ($25-30 \times 10^{-7}$ per ° C.) than other conventional ceramic bodies. However, its expansion coefficient is high enough to limit the thermal shock that articles made therefrom can withstand, and to cause excessive warpage of such articles.

It has been known for some time that natural petalite, which contains lithia, alumina and silica in the molecular ratio of 1:1:8 respectively, has a very small, negative expansion coefficient ($-4.9 \times 10^{-7}$ per ° C.). However, attempts to manufacture sintered bodies from this material by firing in the conventional manner have met with little success because the temperature at which sintering and coalescence occur is very close to the temperature at which complete melting results. Therefore, firing a preformed body of petalite particles in the conventional manner to sinter the particles results in a non-uniform body wherein one portion exhibits a high degree of porosity and/or another portion becomes hot enough to flow or sag, thereby distorting the shape of the article. Intentional overfiring of the article to insure adequate coalescence throughout is unsuccessful, even if supported by additional means to prevent deformation, since the article is thereby partly converted to a glass matrix having an expansion coefficient of $45 \times 10^{-7}/°$ C. while the balance of the article will remain as crystals of beta-spodumene having an expansion coefficient of about zero. This causes crazing of the body when cooled. On the other hand, limiting the firing temperature to preclude overfiring of any portion of the article, results in a porous body with a modulus of rupture of about 1000–3000 p.s.i. which will objectionably absorb materials used in contact therewith.

Combining petalite with small admixtures of talc or one or more compounds of the alkaline earth metals produces compositions which, although suitable for some purposes have an undesirably high firing shrinkage.

An object of this invention is to provide an article comprising a mixture of crystalline material and a thermally devitrifiable glass which will convert at least in part to the same crystalline phase as the crystalline material.

Another object of the present invention is to provide a ceramic article having a low or zero thermal expansion which will maintain its useful properties when utilized at elevated temperatures for extended periods of time.

Another object is to provide a ceramic article having high chemical durability.

A further object is to provide a ceramic article which will withstand repeated severe thermal shocks.

Another object is to provide a ceramic mixture having a wide firing range.

Still another object is to provide a ceramic mixture having low firing shrinkage.

Additional objects, features and advantages of the present invention will become apparent, to those skilled in the art, from the following description.

In general, the objects of the present invention are achieved by preparing a ceramic batch of finely divided low expansion crystalline lithia-aluminosilicate and a low expansion thermally devitrifiable lithia-aluminosilicate glass which will, upon exposure to heat applied incidental to sintering the mixture, convert to a low expansion crystalline lithia-aluminosilicate, said glass comprising about 5 to 50 percent by weight of the total on the oxide basis, before preforming the batch to the desired shape of the article.

While compositions of crystalline lithia-aluminosilicates and lithia-aluminosilicate glass are preferred for the purposes of this invention, it has been found that compositions having about 5 to 50 percent by weight of said glass and 95 to 50 percent by weight of crystalline lithia-aluminosilicates are particularly suitable. Crystalline lithia-aluminosilicates, such as petalite, have an undesirably narrow firing range, while lithia-aluminosilicate glasses have high expansion coefficients. It has been found necessary to combine approximately 5% by weight of said glass with crystalline lithia-aluminosilicates to obtain a firing range which will permit articles to be fired without substantial danger of melting the crystalline phase. Such a combination also had a suitable expansion coefficient of $-4.0 \times 10^{-7}$ per ° C. Further additions of said glass resulted in an acceptable firing range; however, additions beyond about 50% by weight of the lithia-aluminosilicate glass increased the expansion coefficient to a degree rendering the compositions unsuitable for some of the object purposes. The expansion coefficient of a composition having 50% by weight of said glass is about $+4.1 \times 10^{-7}$ per ° C. It has been further found that compositions having about 5% to 50% by weight of said glass also have a very low or zero firing shrinkage while providing good mechanical strength.

More specifically, low expansion crystalline lithia-aluminosilicates may be illustrated by petalite having an $Li_2O \cdot Al_2O_3 \cdot SiO_2$ ratio of 1:1:8, a substance commonly known as lithium feldspar having a ratio of 1:1:6, beta-spodumene having a ratio of 1:1:4 and beta-eucryptite having a ratio of 1:1:2. Table I shows some examples of compositions by weight percent of low expansion thermally devitrifiable lithia-aluminosilicate glass, which will upon firing convert to a low expansion crystalline lithia-aluminosilicate. Such glass compositions comprise $Li_2O$, $Al_2O_3$ and $SiO_2$ in such amounts that a major proportion of the glass can be precipitated as a low expansion crystalline lithia-aluminosilicate.

Example 1 of Table I shows the approximate composition of a glass found to be particularly useful in this invention.

Table 1

|  | 1 | 2 | 3 | 4 | 5 | 6 | 7 | 8 | 9 |
|---|---|---|---|---|---|---|---|---|---|
| $SiO_2$ | 70 | 70 | 57 | 62 | 73 | 58 | 56 | 68 | 64 |
| $Al_2O_3$ | 18 | 15 | 15 | 15 | 14 | 14 | 12 | 14 | 12 |
| $TiO_2$ | 5 | 7 | 12 | 11 | 4 | 14 | 14 | 7 | 14 |
| $Li_2O$ | 3 | 4 | 5 | 4 | 5 | 4 | 3 | 4 | 3 |
| MgO | 3 |  |  |  |  | 9 | 4 | 1 | 4 |
| ZnO | 1 |  |  |  |  |  |  |  |  |
| CaO |  |  |  |  |  |  | 11 | 2 | 3 |
| $CaF_2$ |  |  |  |  | 2 |  |  |  |  |
| $Na_2O$ |  | 1 | 2 | 1 | 2 | 1 |  | 1 |  |
| $K_2O$ |  |  |  |  |  |  |  |  |  |
| $B_2O_3$ |  | 3 | 5 | 3 |  |  |  | 3 |  |
| $ZrO_2$ |  |  | 4 | 4 |  |  |  |  |  |

Commercial petalite has a composition by weight percent which varies within the range shown in Table 2.

Table 2

| | |
|---|---|
| $SiO_2$ | 76.2–77.8 |
| $Al_2O_3$ | 16.8–17.2 |
| $Li_2O$ | 4.3–4.6 |
| MgO | 0–0.2 |
| CaO | 0–0.2 |
| $Fe_2O_3$ | 0.05–0.2 |
| $K_2O$ | 0.1–0.4 |
| $Na_2O$ | 0.1–0.3 |

Table 3 sets forth examples of several batch compositions in percent by weight which illustrate the objects of this invention but are not limitations thereon. Example 1 is a batch of 100% petalite and is included for comparison. The lithia-aluminosilicate glass used is of the composition illustrated in Example 1 of Table 1.

Table 3

|  | 1 | 2 | 3 | 4 | 5 | 6 | 7 | 8 | 9 | 10 | 11 |
|---|---|---|---|---|---|---|---|---|---|---|---|
| Petalite | 100 | 95 | 90 | 85 | 80 | 75 | 70 | 65 | 60 | 55 | 50 |
| Lithia-Aluminosilicate glass |  | 5 | 10 | 15 | 20 | 25 | 30 | 35 | 40 | 45 | 50 |

Table 4 sets forth the compositions of the fired articles computed from the batches to the oxide basis in weight percent, as well as some of their properties.

Table 4

|  | 1 | 2 | 3 | 4 | 5 | 6 | 7 | 8 | 9 | 10 | 11 |
|---|---|---|---|---|---|---|---|---|---|---|---|
| $SiO_2$ | 76.8 | 76.5 | 76.1 | 75.7 | 75.4 | 75.0 | 74.7 | 74.3 | 74.0 | 73.6 | 73.2 |
| $Al_2O_3$ | 17.4 | 17.4 | 17.4 | 17.5 | 17.5 | 17.5 | 17.5 | 17.5 | 17.4 | 17.6 | 17.6 |
| $Li_2O$ | 4.5 | 4.4 | 4.3 | 4.2 | 4.1 | 4.0 | 4.0 | 3.9 | 3.8 | 3.7 | 3.6 |
| $TiO_2$ |  | 0.2 | 0.5 | 0.7 | 0.9 | 1.2 | 1.4 | 1.7 | 1.9 | 2.1 | 2.4 |
| MgO | 0.2 | 0.3 | 0.4 | 0.6 | 0.7 | 0.8 | 0.9 | 1.0 | 1.2 | 1.3 | 1.4 |
| Impur. | 1.1 | 1.2 | 1.3 | 1.3 | 1.3 | 1.5 | 1.5 | 1.6 | 1.6 | 1.7 | 1.8 |
| Exp. Coeff. × $10^7$, °C. | −4.9 | −4.0 | −3.1 | −2.2 | −1.3 | −0.4 | +0.5 | +1.4 | +2.3 | +3.2 | +4.1 |
| Firing Temp. Min (°C.) | 1,310 | 1,290 |  |  |  | 1,220 |  |  |  |  | 1,170 |
| Max. (°C.) | 1,330 | 1,320 |  |  |  | 1,260 |  |  |  |  | 1,230 |
| Opt. (°C.) | 1,320 | 1,305 |  |  |  | 1,240 |  |  |  |  | 1,200 |

Any of the standard methods for making ceramic articles, such as slip casting and the like can be used to manufacture articles which incorporate the advantages of the present invention. In addition ceramic articles may be formed by dipping or immersing an organic carrier in a mixture of finely divided and uniformly mixed batch of crystalline lithia-aluminosilicate, thermally devitrifiable lithia-aluminosilicate glass and an organic vehicle or binder, thereafter forming an article and firing it, which firing sinters the crystalline lithia-aluminosilicate and lithia-aluminosilicate glass and removes the organic materials through volatization, producing a unitary ceramic structure of the preformed shape.

The advantages of this invention are obtained when the ceramic batch contains a total of 5 to 50 percent by weight of a thermally devitrifiable lithia-aluminosilicate glass, and 50 to 95 percent by weight of crystalline lithia-aluminosilicate computed on the oxide basis. Obviously, each such composition may be particularly suitable for a specific purpose. However, a composition comprising 25 percent by weight of thermally devitrifiable lithia-aluminosilicate glass and 75 percent by weight of petalite is particularly effective since it has a sufficiently large firing range for conventionally firing articles and produces a ceramic article with a high modulus of rupture and a very low expansion coefficient.

The batch may be prepared by ball-milling to the desired particle size, which varies over a wide range and is determined for each type, size and shape of article. When preparing a batch for the above noted method of coating an organic carrier, particle sizes of 200 mesh or smaller have been found to be particularly suitable. The organic vehicle or binder is required to bond the unfired ceramic materials to the carrier, to impart green strength to the coated carrier and to retain the formed, unfired article in the desired shape after forming and prior to firing. The binder may be prepared by mixing a synthetic resin such as an epoxy, phenolic or the like with thinners such as an azeotropic mixture of butanol and toluene, or a mixture of a Versamid, ethyl-acetate and isopropanol, and the like. In this method, forming is accomplished by shaping the coated carrier by passing through contoured rollers, reeling or winding, pressing and the like. Versamid is a thermoplastic polymer prepared by condensation of polymerized unsaturated fatty acids, such as dilinoleic acid, with aliphatic amines, such as ethylene diamine. Versamids are clearly described in the publication entitled "Epoxy Resins" by Lee and Neville, 1957, pages 166–171, McGraw-Hill Book Co., Inc., Library of Congress Catalog Card No. 56–12537; also in the publication entitled "Epoxy Resins" by Skeist, 1958, pages 61–62, 67–74, and 164–165, Reinhold Publishing Corp., Library of Congress Catalog Card No. 58–13583; also in the publication entitled "Polyamide Resins" by Floyd, 1958, pages 25–26, Reinhold Publishing Corp., Library of Congress Catalog Card No. 58–7395; and also in the publication entitled "Versamid Polyamide Resins" by General Mills Chemical Division, Kankakee, Illinois, 1957, publication No. 11–D–2.

A preferred embodiment of this invention is a ceramic article made of the composition illustrated in Example 6 of Tables 3 and 4. This composition is prepared by mixing 1620 grams of crystalline petalite having a 200 mesh size or less, 540 grams of thermally devitrifiable lithia-aluminosilicate glass of the composition shown in Example 1 of Table 1 also having a 200 mesh size or less, 640 cc. of isopropanol, 860 cc. of ethyl-acetate, 188 cc. of Versamid 115 manufactured by the General Mills Co., and 480 cc. of a synthetic resin known as Hysol 6111 manufactured by the Hysol Corp. of Olean, New York, in a ball mill until the mixture has a viscosity of between 12 and 15 seconds as measured by a number 3 orifice in a Zahn viscometer. The article is then formed by immersing an organic carrier composed of tea bag paper, cellulose acetate paper, onion skin paper, nylon cloth or the like, in the prepared batch thereby coating it. The coated carrier is then dried by heating to 120° C. for 2 minutes. The dried and coated carrier is then heated to 180° C. and formed and/or shaped to the desired configuration after which it is fired.

The article is fired to a temperature of about 1240° C., which firing converts the petalite, which is a stable crystalline phase only at temperature of less than about 700° C., and the thermally devitrifiable lithia-aluminosilicate glass, irreversibly to a solid solution of silica and beta-spodumene; the presence of crystalline beta-spodumene being discernible by X-ray examination. Although the firing schedule can be varied considerably, one which is satisfactory and preferable for relatively thin walled articles such as the preferred embodiment, is as follows:

*Table 5*

| Temp. range: | Firing rate |
|---|---|
| Room temp. to 700° C. | 350° C./hr. |
| Hold at 700° C. | 1 hour. |
| 700° C. to 1220° C. | Furnace rate. |
| Hold at 1220° C. | 30 minutes. |
| Cool to room temp. | Furnace rate. |
| Refire to 1240° C. | 300° C./hr. |
| Hold at 1240° C. | 7 hours. |

The minimum firing temperature is the temperature at which the refractory material will coalesce. Coalescence of the refractory is considered to result from surface tension although no liquid phase exists and hence the temperature at which this phenomenon commences is also called the sintering point.

The maximum firing temperature, or deforming temperature, refers to the temperature at which a liquid phase appears and hence, the temperature at which a body commences to deform by its own weight. The mean temperature, of course, is the average of the maximum and minimum firing temperature.

The article is finally cooled to about 100° C. at furnace rate in about 16 hours and removed from the furnace. Cooling, however, can be achieved in substantially less time by turning off the furnace and allowing the article and furnace to cool together to room temperature or by removing the fired article from the furnace. Since the article has an expansion coefficient of nearly zero the cooling rate may be vary rapid without detrimental effects resulting from thermal shock.

A firing range of 30° C. is ample for conventionally firing most articles, but greater firing ranges are desirable. Furthermore, while compositions with firing ranges less than 30° C. are impractical for firing effectively on a commercial scale, certain compositions with firing ranges of 10 to 30° C. exhibit some of the advantages of the present invention and can be fired in a precisely controlled furnace which has little temperature variations within.

It should be noted that this preferred embodiment will produce relatively thin-walled articles which may be used as such or may be stacked, reeled or otherwise combined to form a finished article or raw stock from which a finished article may then be cut, ground or otherwise shaped. The invention, of course, is not limited to such articles and the same composition may be slip cast or subjected to ordinary ceramic forming methods by using a batch such as described above or by varying the synthetic resin and/or binder materials and varying the viscosity to suit a particular article and/or method. Such variations, however, can be readily determined by one familiar with the art of preparing ceramic compositions and forming articles therefrom.

The preferred embodiment is particularly useful because articles thereby formed has a high thermal shock resistance resulting from a low expansion coefficient of $-0.4 \times 10^{-7}$ per ° C. and it can be readily fired because such a composition has a firing range of well over 30° C.

Although the present invention has been described with respect to specific details of lithia-aluminosilicate mixtures, it is obvious to those skilled in the art that mixtures of other crystalline materials and thermally devitrifiable glasses which will convert at least in part to the same crystalline phase as the crystalline materials, such as basalt, silica, feldspar or the like, can also be used for forming the articles of this invention. It is therefore, not intended that the details contained herein be limitations upon the scope of the invention except insofar as set forth in the following claims.

What is claimed is:

1. The method of making a unitary, low expansion ceramic article which comprises mixing a batch comprising 50–95% by weight of crystalline lithia-aluminosilicates and 50–5% by weight of a thermally devitrifiable lithia-aluminosilicate glass, said glass comprising $Li_2O$, $Al_2O_3$, and $SiO_2$ in such amounts that a major portion of the glass can be precipitated as a low expansion crystalline lithia-aluminosilicate, forming the batch to an article of the desired shape, firing the article at a temperature between the sintering temperature and the deforming temperature to sinter the batch material and thermally devitrify said glass, and thereafter cooling the article.

2. The method of claim 1 wherein the crystalline lithia-aluminosilicate is petalite.

3. The method of making a unitary, low expansion ceramic article which comprises mixing a batch comprising about 75% by weight of crystalline lithia-aluminosilicates and about 25% by weight of a thermally devitrifiable lithia-aluminosilicate glass, said glass comprising $Li_2O$, $Al_2O_3$, and $SiO_2$ in such amounts that a major portion of the glass can be precipitated as a low expansion crystalline lithia-aluminosilicate, forming the batch to an article of the desired shape, firing the article at a temperature between the sintering temperature and the deforming temperature to sinter the batch material and thermally devitrify said glass, and thereafter cooling the article.

4. The method of making a unitary, low expansion ceramic article which comprises mixing a batch comprising about 75% by weight of petalite and about 25% by weight of a thermally devitrifiable lithia-aluminosilicate glass, said glass comprising $Li_2O$, $Al_2O_3$, and $SiO_2$ in such amounts that a major portion of the glass can be precipitated as a low expansion crystalline lithia-aluminosilicate, forming the batch to an article of the desired shape, firing the article at a temperature between 1220° C. and 1260° C. to sinter the batch material and thermally devitrify said glass, and thereafter cooling the article.

5. The method of making a unitary, low expansion ceramic article which comprises mixing a batch comprising 50–95 percent by weight of crystalline lithia-aluminosilicates and 50–5 percent by weight of thermally devitrifiable lithia-aluminosilicate glass, said glass comprising by weight about 56–73 percent $SiO_2$, 12–18 percent $Al_2O_3$, and 3–5 percent $Li_2O$, forming the batch to an article of the desired shape, firing the article at a temperature between the sintering temperature and the deforming temperature to sinter the batch material and thermally devitrify said glass, and thereafter cooling the article.

6. The method of claim 5 wherein the crystalline lithia-aluminosilicate is petalite.

7. The method of making a unitary, low expansion ceramic article which comprises mixing a batch comprising about 75 percent by weight of crystalline lithia-aluminosilicates and about 25 percent by weight of a thermally devitrifiable lithia-aluminosilicate glass, said glass comprising by weight about 56–73 percent $SiO_2$, 12–18 percent $Al_2O_3$, and 3–5 percent $Li_2O$, forming the batch to an article of the desired shape, firing the article at a temperature between the sintering temperature and the deforming temperature to sinter the batch material and thermally devitrify said glass, and thereafter cooling the article.

8. The method of claim 7 wherein the crystalline lithia-aluminosilicate is petalite.

9. The method of making a unitary, low expansion ceramic article which comprises, mixing a batch comprising about 75 percent by weight of petalite and about 25 percent by weight of a thermally devitrifiable lithia-aluminosilicate glass, said glass comprising by weight about 56–73 percent $SiO_2$, 12–18 percent $Al_2O_3$, and 3–5 percent $Li_2O$, forming the batch to an article of the desired shape, firing the article at a temperature between 1220° C. and 1260° C. to sinter the batch material and thermally devitrify said glass, and thereafter cooling the article.

References Cited by the Examiner

UNITED STATES PATENTS

| | | | |
|---|---|---|---|
| 1,786,482 | 12/1930 | Curtis | 65—33 |
| 2,693,668 | 11/1954 | Slayter | 65—18 X |
| 2,998,675 | 9/1961 | Olcott et al. | 65—33 |

DONALL H. SYLVESTER, *Primary Examiner.*